United States Patent [19]
Noll et al.

[11] Patent Number: 5,791,428
[45] Date of Patent: Aug. 11, 1998

[54] LOCKING REDUCED-EFFORT HOOD CONTROL APPARATUS

[75] Inventors: Michael L. Noll, Fort Wayne; Stanley L. Hochstetler, Columbia City; Brian K. Ballschmidt, Fort Wayne; Patrick G. Gerardot, Fort Wayne; Richard L. Malecki, Fort Wayne; Marvin Reinhard, Bluffton, all of Ind.

[73] Assignee: Navistar International Transportation Corp., Chicago, Ill.

[21] Appl. No.: 538,538

[22] Filed: Oct. 3, 1995

[51] Int. Cl.⁶ .......................... B62D 25/12; B62D 25/00; E04F 25/10
[52] U.S. Cl. .......................... 180/69.21; 296/56; 292/338; 292/DIG. 14
[58] Field of Search .......................... 180/69.21, 69.2, 180/89.14, 89.17, 68.4; 49/394, 395, 379, 386; 296/57.1, 56, 100, 76, 146.8; 292/338, DIG. 14; 16/82, 85

[56] References Cited

U.S. PATENT DOCUMENTS

| | | | |
|---|---|---|---|
| 2,994,451 | 8/1961 | Hoag | 296/76 |
| 2,996,210 | 8/1961 | Thomas | 296/76 |
| 3,017,944 | 1/1962 | Norrie | 180/69 |
| 3,232,368 | 2/1966 | Sullivan | 180/69 |
| 3,419,099 | 12/1968 | Brumbaugh et al. | 180/69 |
| 3,754,613 | 8/1973 | Stephens et al. | 180/69 C |
| 4,134,179 | 1/1979 | Silaghi | 180/69.21 |
| 4,278,280 | 7/1981 | Rashbaum | 292/338 |
| 4,281,733 | 8/1981 | Miller et al. | 180/69 C |
| 4,566,552 | 1/1986 | Hoffman et al. | 180/69.21 |
| 4,853,985 | 8/1989 | Perry | 180/69.21 |
| 4,938,520 | 7/1990 | Shelton | 296/76 |
| 4,991,675 | 2/1991 | Tosconi et al. | 180/69.21 |
| 5,217,267 | 6/1993 | Yagi | 292/338 |
| 5,238,213 | 8/1993 | Pool | 292/338 |

FOREIGN PATENT DOCUMENTS

| | | | |
|---|---|---|---|
| 684973 | 4/1964 | Canada | 180/69.21 |
| 2415204 | 10/1974 | Germany | 292/338 |
| 2558313 | 6/1977 | Germany | 292/338 |
| 81/02872 | 10/1981 | WIPO | 180/69.21 |

OTHER PUBLICATIONS

"CH600 The High Performance Highway Conventional" Brochure No. 1B–CH–Jun. 1994–APL, Mack Trucks, Inc., 1994.

Primary Examiner—Eric D. Culbreth
Assistant Examiner—Gary Savitt
Attorney, Agent, or Firm—Dennis K. Sullivan; Jeffrey P. Calfa

[57] ABSTRACT

A hood control apparatus comprises at least one counterbalancing spring engaged between a forward tilt hood and a top surface radiator frame mounted under the hood. The spring is chosen to have a spring rate such that, when the hood is opened, the spring supports the hood in an open equilibrium position less than fully open. A locking latch device is provided for latching the hood in the open position against unintended closure thereof.

15 Claims, 2 Drawing Sheets

LOCKING REDUCED-EFFORT HOOD CONTROL APPARATUS

BACKGROUND OF THE INVENTION

The present invention relates to a hood control apparatus for use on large forward tilt hoods of the type which are pivotally mounted to the frame on a horizontal axis adjacent the front bumper, such as those found on trucks and school busses, the apparatus assisting in opening and closing of the hood, requiring reduced effort on the part of the operator and further providing for capability to lock the hood in a desired open position thereof.

THE PRIOR ART

Various hood tilt assist systems incorporating counterbalance springs to reduce the physical effort required, have been proposed for use in assisting the opening and the closing of hoods on large vehicles such as trucks and busses. See, for example, U.S. Pat. Nos. 3,754,613, 4,566,552, and 4,991,675. In such systems, however, the counterbalance springs are overcome by the weight of the hood, allowing the hood to open to its maximum point as defined by a limiting cable or device or an assist spring becoming solid. Since truck hoods are relatively heavy, it still has required substantial effort on the part of the operator to open and close the hood. However, as the population of female drivers of truck and school buses has increased, it is desirable to require less effort to open and close the hood.

In the hood described herein, the counterbalancing is such that the hood opens to an open equilibrium position fully supported by the counterbalance springs which is less than the fully open position of the hood. Furthermore a positive locking device is provided to prevent inadvertent closure of the hood from said open position without manually releasing the locking device. Although it is known to provide a positive locking device which also functions as a limiting stop in the fully open position, it is not known to provide a locking device operable in a less than fully open position.

SUMMARY OF THE INVENTION

Accordingly, it is a primary object of the invention described and claimed herein to provide a reduced-effort control system for a hood of a truck or bus wherein the hood reaches an open position of fully supported equilibrium which is a less than fully open position.

A further object of the invention is to provide a reduced-effort control system for a hood of a truck or bus which incorporates structure therein for locking the hood in an open position of supported equilibrium thereby preventing inadvertent closure of the hood.

Yet a further object of the invention is to provide a locking device for such hood wherein the device is locked by engagement of a notch against a bracket.

Still a further object of the invention is to provide a locking device for such hood wherein the device has a manually engaged unlocked position for use during closure of the hood.

Another object of the invention is to provide a locking device for such hood wherein the device has a rearming device for automatically moving said device from said manually-engaged unlocked position upon closure of the hood.

These and other objects of the invention as will be seen hereinafter are specifically met in a reduced-effort hood control apparatus for a tilt hood of a mobile vehicle of the type which is pivotally mounted to the vehicle frame for rotation about a horizontal axis located adjacent the front bumper including at least one counterbalance spring disposed between said hood and a frame mounted member wherein the spring is sufficiently strong to maintain said hood in an open equilibrium position supported by said spring while permitting further movement of said hood against the force of said spring toward said open position. The apparatus further includes a locking mechanism which latches the hood and prevents closure thereof from said open equilibrium position, the locking mechanism comprising a locking bar pivotally attached to the hood and extending through an aperture in a fixed bracket, the locking bar having a notch for engaging a lower edge of the bracket when said hood is approximately in said open equilibrium position. The locking bar further may include a horizontal unlocking flange which may be manually positioned, when said hood is in said open equilibrium position, to engage a horizontal notch in said aperture and thereby prevent said notched surface of said bar from engaging said lower bracket aperture edge to permit closure of said hood. The unlocking flange terminates upon said notched surface clearing said aperture during closure and further includes a tapered rearming surface disposed on an edge facing said hood pivot to shift said locking bar laterally in said aperture during opening of said hood to ensure engagement of said notched surface with said bracket.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
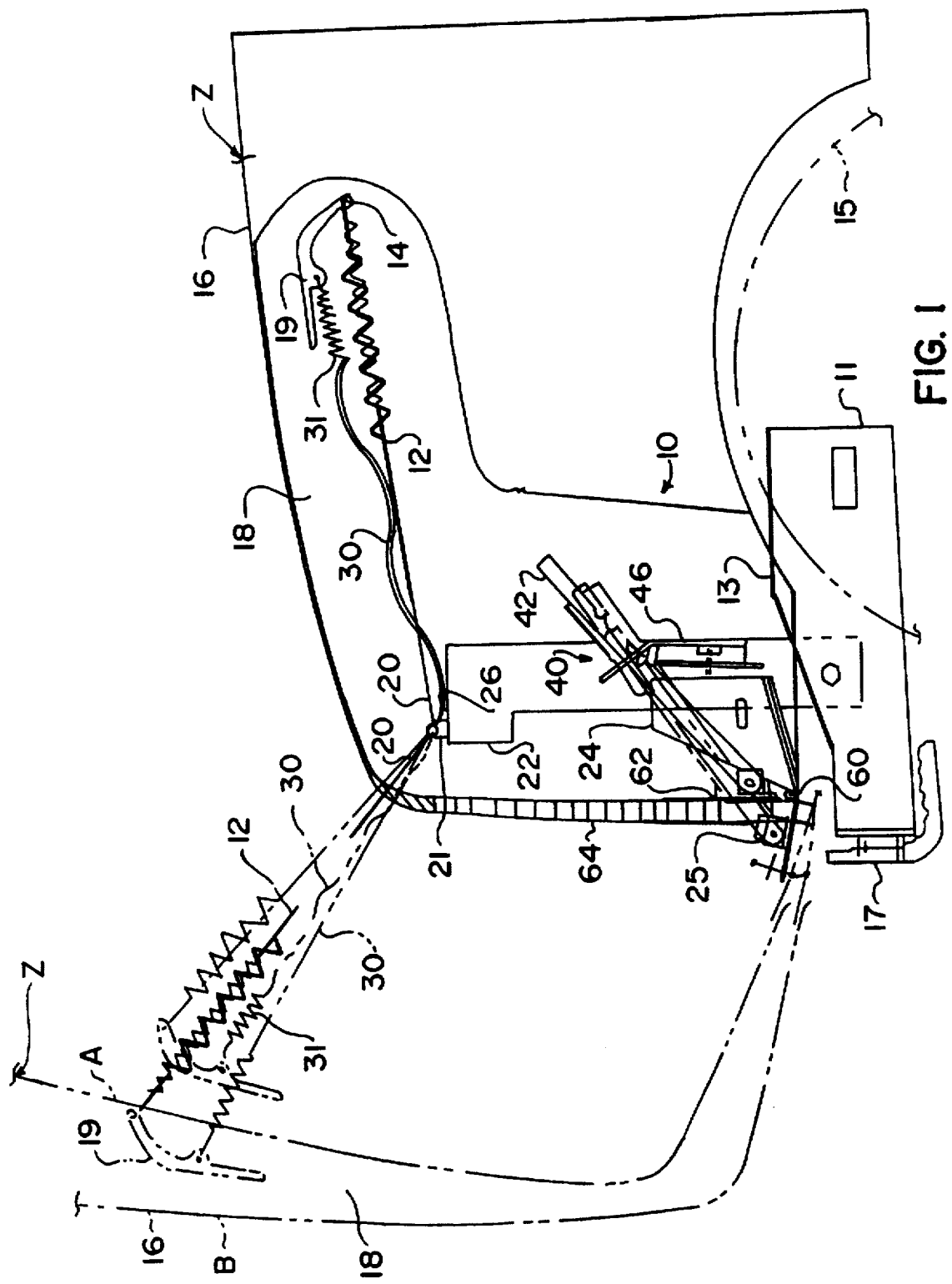
FIG. 1 is a side elevation illustrating diagrammatically a portion of a truck frame having a partially cut away hood mounted thereon and incorporating the hood control apparatus of the present invention with different open positions of the hood shown in phantom lines.
Figure 2:
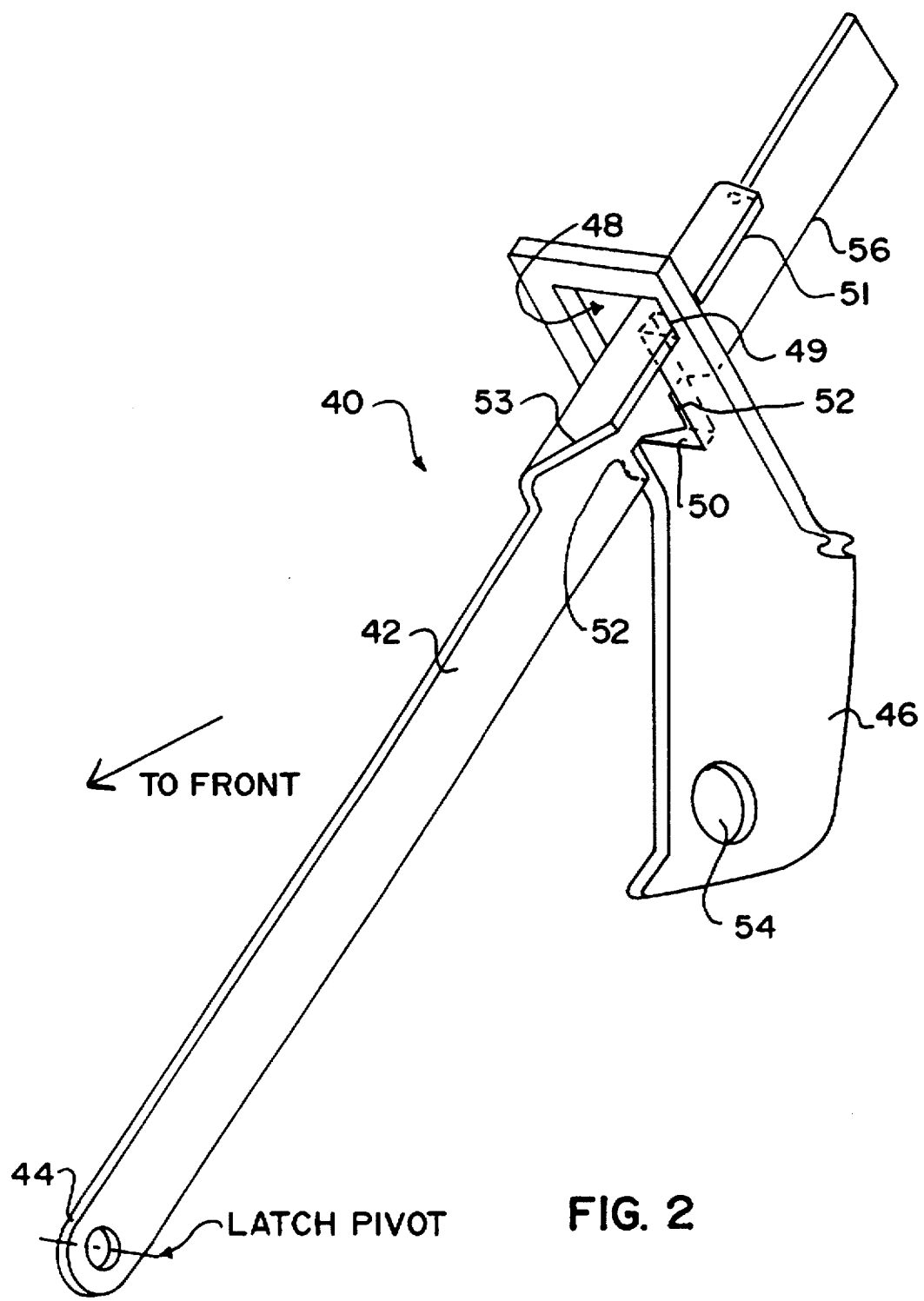
FIG. 2 is an enlarged perspective view of the locking bar and bracket aperture in the engaged position.

Referring now to the drawings in greater detail, there is illustrated diagrammatically a reduced-effort hood control apparatus generally identified by the reference numeral 10 for controlling a hood 18 mounted to the forward end of a mobile vehicle 11, such as a school bus or a truck. The vehicle 11 conventionally includes parallel longitudinally extending interconnected frame rails 13 on each side of the vehicle (only one side being shown) supported on wheels 15 and a transversely extending bumper 17 supported at the front end of the vehicle by the frame rails 13. The hood 18 has a fixed rearward most point Z when closed. Further secured to each of the frame rails is an upstanding radiator support bracket 22 defining a side portion of the radiator support structure. A hood support bracket 24 is secured and adjustably fixed to the radiator support bracket 22 and extends forwardly therefrom to a hinge portion for receiving a horizontal transverse pivot pin 60 disposed adjacently above the bumper 17. A hood hinge plate 62 is pivotally mounted on the pivot pin 60 and is attached to the front reinforcement member 64 of the hood 18. Thus, the hood 18 may be opened to expose the vehicle engine (not shown) by pivoting it about pivot pin 60 so that the hood opens forwardly away from the vehicle chassis. This Pivoting causes the fixed rearward most point Z of the hood 18 to move in an arc away from the closed position.

To control and assist the opening and closing of the hood 18, the apparatus 10 has a primary counterbalance spring 12 on each side which is pivotably attached at one end 14 to a bracket 19 attached to a free or swing end 16 of the vehicle hood 18 and which is pivotably attached at another end 20 by a bracket 21 to a fixed element, such as the radiator support 22. To keep the hood 18 from reaching the fully open position thereof, a secondary spring 31 and cable 30 is also attached in a manner identical to that for the primary biasing-member 12. The secondary spring 31 only comes into play when the cable 30 is pulled tight should the force of the counterbalance spring 12 be overcome, such as by a gust of wind when the hood 18 is open. Thus, the secondary spring 31 is normally non-functional and only begins biasing against full opening of the hood 18 once the spring rate of the primary spring 12 is overcome, toward an undesired fully open position of the hood 18.

The spring rate of the counterbalance spring 12 and the locations of the attachment points respectively to the hood and radiator support is hood structure dependent, depending on the weight of the hood 18, and preferably is such that the hood opens to an equilibrium position A fully supported by the counterbalance springs 12 which is short of the completely open position B. In this position, one can be assured that the full counterbalancing force is being exerted to assist closure of the hood. Additionally, it is preferred to maintain the hood 18 less than completely open because such extreme position causes stress on hinges 62 holding the hood 18 to the front of the chassis 11. In this open equilibrium position A, the fixed rearward most point Z of the hood 18 is located forward of the pivot D in 60.

When the hood 18 is unlatched from a closed position thereof, the spring 12 preferably will cause the hood 18 to elevate a few inches from its closed position, unassisted, again assuring that the maximum counterbalancing force is available to assist in opening the hood 18.

During closure of the hood 18, the spring 12 first contracts to aid in closure to the overcenter point (center of gravity is over the pivot) and then extends again to provide a controlled closure, with the weight of the hood 18 plus a small amount of manual assistance overcoming the spring for complete closure of the hood 18 to a position permitting engagement of the conventional side latches (not shown) to secure the hood in the closed position.

Once the hood 18 is opened to the open equilibrium position A, it is desired to be able to releasably lock or latch the hood 18 against undesired closure, such undesirable motion being caused by a gust of wind, for example. To maintain the hood 18 open against undesired closure, a locking latch apparatus 40 is provided which comprises a notched locking bar 42 having one end 44 thereof pivotably engaged as at 25 to the lower portion of the hood 18 a small distance above the pivot pin 60 and a cooperating catch member 46 which is mounted to the radiator support member 22 to accommodate sliding engagement of the distal end 56 of the locking bar 42 within an aperture 48 therein, the aperture 48 including a cooperating lower edge 50 against which one of a plurality of teeth 52 disposed on the lower edge of the locking bar 42 can engage by operation of gravity to keep the hood 18 from closing until closure is desired. It will be seen that the locking bar 42 is only provided with one or two teeth 52 appropriately positioned along the length of the slide 42 in a manner to assure that the hood 18 is held desired open equilibrium position A while assuring that the hood 18 cannot close of its own accord.

To allow for closure of the hood 18, the engagement between a tooth 52 of the locking bar 42 and the flange 50 of the catch member is releasable. Such release may simply be produced by manually lifting the locking bar 42 within the vertically elongated aperture 48 and moving the hood 18 toward closure while holding the locking bar disengaged so that the notched length of the locking bar 42 merely slides above the edge 50 of the catch member 46 and thereafter permitting the unnotched portion of the locking bar to slide on the edge 50, a single locking latch member 40 being so that the operator can singlehandedly close the hood 18.

However, in the preferred embodiment illustrated, it will be note that the aperture 48 is further provided with a laterally extending notch 49 adjacent the upper edge thereof and the locking bar is provided with an outturned flange 51 disposed to engage the slot 49 when the locking bar is lifted sufficiently within aperture 48 to disengage the notched teeth 52 from the lower edge 50 of the aperture and the locking bar 42 is manually moved laterally in the aperture 48 to cause such engagement. Thus, in the preferred embodiment, when the hood is open, the operator may lift the locking bar 42 and move it laterally to engage the flange 51 in the slot 49 to prevent engagement of the teeth 52. Thereafter, the hood may be closed with no need for an operator's hand to remain within the hood during closure.

It will further be noted that the forward portion 53 of the outturned flange is tapered and terminates slightly forwardly of the forwardmost tooth 52. During closure, the flange 51 passes completely through the aperture 48 so that the flange 51 disengages from the slot 49 thereby dropping the unnotched lower edge of the locking bar 42 on the lower edge 50 of the aperture 48. Thus the locking device is rearmed to automatically engage the locking device when the hood is subsequently opened, the tapered edge 53 forcing the locking bar toward the side of the aperture opposite the slot 49 as the hood is opened.

As described above, the hood control apparatus of the present invention provides a number of advantages, some of which have been described above and others of which are inherent in the invention. Also modifications can be made to the hood control apparatus without departing from the teachings herein. Accordingly, the scope of the invention is only to be limited as necessitated by the accompanying claims.

What is claimed is:

1. In combination with a mobile vehicle chassis of the type having a hood disposed to open forwardly of the vehicle and pivot about a horizontal transverse pivot on a pivot pin to expose an engine compartment thereof and wherein said hood has a fixed rearward most point when closed, a hood control apparatus comprising counterbalance spring means engaged to and between said hood and a chassis mounted structure under the hood, the counterbalance spring means acting to assist in opening and closing of the hood and capable of fully supporting said hood in a position of open equilibrium forwardly of said pivot, said hood having a fully open position reachable only by a force in addition to the weight of said hood overcoming said counterbalance spring means when in said open equilibrium position, said open equilibrium Position of said hood being short of said fully open position and said open equilibrium position having said-fixed rearward most point of said hood forward of said pivot pin.

2. The apparatus of claim 1 wherein said spring is pivotably mounted to the hood by a bracket.

3. The apparatus of claim 2 wherein said spring is also pivotably mounted to a top surface of a radiator frame.

4. The system of claim 1 further including locking latch means for releasably maintaining the position of the hood in said open equilibrium position.

5. The apparatus of claim 4 wherein the latch means include a locking bar having at least one tooth and a cooperating catch member having an edge thereon against which the tooth releasably engages.

6. The apparatus of claim 5 wherein said locking bar is pivotably engaged to a lower hinge of the hood.

7. The apparatus of claim 5 wherein said catch member is mounted to a fixed member on said vehicle chassis.

8. The apparatus of claim 5 wherein said tooth on said locking bar is positioned along a length thereof in a manner to hold said hood open at said open equilibrium position.

9. The apparatus of claim 5 wherein said catch member has an aperture through which said locking bar extends, said tooth releaseably engaging a lower edge of said aperture.

10. The apparatus of claim 9 wherein said locking bar has a laterally extending flange and said aperture has a laterally extending slot positioned relative to said lower edge to prevent said locking bar tooth from engaging said lower edge upon releasably engagements of said laterally extending flange in said laterally extending slot.

11. The apparatus of claim 10 wherein said laterally extending flange of said locking bar terminates adjacent the forward side of said tooth such that upon closure of said hood, said laterally extending flange disengages from said laterally extending slot and, said locking bar engages said lower edge of said aperture.

12. In combination with a mobile vehicle chassis of the type having a hood disposed to open forwardly of the vehicle and pivot about a horizontal transverse pivot to expose an engine compartment thereof, a locking latch means for releasably maintaining the position of the hood in an open position comprising a locking bar pivotably attached to said hood and having at least one tooth and a cooperating catch member mounted to said chassis and said catch member having an aperture through which said locking bar extends, said aperture having a lower edge thereon against which the tooth releasably engages, said locking bar having a laterally extending flange and said aperture having a laterally extending slot positioned relative to said lower edge to prevent said locking bar tooth from engaging said lower edge upon engagement of said laterally extending flange in said laterally extending slot.

13. The apparatus of claim 1, additionally comprising a second spring and a cable, one end of said second spring attached to one end of said cable to form a secondary spring arrangement, said secondary spring arrangement being engaged to and between said hood and said chassis mounted structure under said hood, said secondary spring arrangement being of a length such that said second spring will not be under tension when said hood is in said open equilibrium position, and said secondary spring arrangement being of a length and strength to prevent said hood from reaching said fully open position should said counterbalance spring means be overcome.

14. The combination of claim 12 and said laterally extending flange of said locking bar terminating adjacent the forward side of said tooth such that upon closure of said hood, said laterally extending flange disengages from said laterally extending slot and said locking bar engages said lower edge of said aperture.

15. The combination of claim 14 and a counterbalancing spring for supporting said hood in an open equilibrium position less than fully open and said locking latch means being disposed to maintain said hood in said open equilibrium position against unintended closure.

* * * * *